US011145071B2

United States Patent
Chen et al.

(10) Patent No.: US 11,145,071 B2
(45) Date of Patent: Oct. 12, 2021

(54) IMAGE PROCESSING METHOD, NON-TRANSITORY COMPUTER-READABLE STORAGE MEDIUM, AND ELECTRONIC APPARATUS

(71) Applicant: Guangdong OPPO Mobile Telecommunications Corp., Ltd., Guangdong (CN)

(72) Inventors: Yan Chen, Guangdong (CN); Pan Fang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/546,870

(22) Filed: Aug. 21, 2019

(65) Prior Publication Data
US 2020/0065986 A1    Feb. 27, 2020

(30) Foreign Application Priority Data
Aug. 22, 2018 (CN) .......................... 201810962707.9

(51) Int. Cl.
*G06T 7/55*  (2017.01)
*G06T 7/00*  (2017.01)
(Continued)

(52) U.S. Cl.
CPC .............. *G06T 7/55* (2017.01); *G01S 17/894* (2020.01); *G06T 7/521* (2017.01); *G06T 7/97* (2017.01);
(Continued)

(58) Field of Classification Search
CPC .... G06T 7/55; G06T 7/97; G06T 2207/10028
(Continued)

(56) References Cited

U.S. PATENT DOCUMENTS

2010/0046802 A1    2/2010   Watanabe et al.
2013/0100255 A1    4/2013   Ohba et al.
(Continued)

FOREIGN PATENT DOCUMENTS

CN    104935893 A    9/2015
CN    106161943 A    11/2016
(Continued)

OTHER PUBLICATIONS

Lucas Busemeyer et al: "BreedVision—A Multi-Sensor Platform for Non-Destructive Field-Based Phenotyping in 3lant Breeding",Sensors, vol. 13 ,No. 3, Feb. 27, 2013, pp. 2830-2847. (Year: 2013).*
(Continued)

*Primary Examiner* — Jeffery A Williams
(74) *Attorney, Agent, or Firm* — Young Basile Hanlon & MacFarlane, P.C.

(57) ABSTRACT

An image processing method, a non-transitory computer-readable storage medium, and an electronic apparatus are disclosed. The method includes: acquiring a first initial image by a first camera at a first frame rate during an exposure period, and acquiring at least two second initial images by a second camera at a second frame rate during the exposure period; and stitching the at least two second initial images into one second target image; wherein the second target image is a depth image. The first frame rate is less than the second frame rate, and each second initial image is an image comprising depth information.

20 Claims, 8 Drawing Sheets

(51) Int. Cl.
  *H04N 5/247* (2006.01)
  *H04N 5/265* (2006.01)
  *H04N 5/232* (2006.01)
  *G06T 7/521* (2017.01)
  *H04N 7/01* (2006.01)
  *G01S 17/894* (2020.01)

(52) U.S. Cl.
  CPC ......... *H04N 5/23229* (2013.01); *H04N 5/247* (2013.01); *H04N 5/265* (2013.01); *H04N 7/01* (2013.01); *G06T 2207/10028* (2013.01); *G06T 2207/20221* (2013.01)

(58) Field of Classification Search
  USPC .......................................................... 348/135
  See application file for complete search history.

(56) References Cited

U.S. PATENT DOCUMENTS

| | | | |
|---|---|---|---|
| 2013/0222550 | A1 | 8/2013 | Choi et al. |
| 2015/0373322 | A1* | 12/2015 | Goma ...................... H04N 5/44 348/21 |
| 2016/0088206 | A1* | 3/2016 | Robinson ............... G01B 11/22 348/135 |
| 2016/0182896 | A1* | 6/2016 | Seo ...................... H04N 13/271 348/46 |
| 2018/0220052 | A1 | 8/2018 | Granneman |

FOREIGN PATENT DOCUMENTS

| | | |
|---|---|---|
| CN | 106454287 A | 2/2017 |
| CN | 107124604 A | 9/2017 |
| CN | 107154014 A | 9/2017 |
| CN | 107424187 A | 12/2017 |
| CN | 107506752 A | 12/2017 |
| CN | 107527033 A | 12/2017 |
| CN | 206975217 U | 2/2018 |
| CN | 108347561 A | 7/2018 |
| CN | 108965732 A | 12/2018 |
| CN | 109040591 A | 12/2018 |

OTHER PUBLICATIONS

Grau O et al: "A Free-Viewpoint Video System for Visualization of Sport Scenes Applications of Depth Metadata",BBC R&D White Paper,No. WHP 007, Sep. 1, 2001, pp. 1-11. (Year: 2001).*
First Office Action from China patent office in a counterpart Chinese patent Application 201810962707.9, dated Sep. 11, 2019 (7 pages).
International search report, PCT/CN2019/101363, dated Nov. 18, 2019 (4 pages).
European search report, EP19192665, dated Nov. 27, 2019 (12 pages).
Lucas Busemeyer et al: "BreedVision—A Multi-Sensor Platform for Non-Destructive Field-Based Phenotyping in Plant Breeding",Sensors, vol. 13 ,No. 3, Feb. 27, 2013, pp. 2830-2847.
Grad O et al: "A Free-Viewpoint Video System for Visualization of Sport Scenes Applications of Depth Metadata",BBC R&D White Paper,No. WHP 007, Sep. 1, 2001, pp. 1-11.
Haytham Mohamed et al: "A Novel Real-Time Reference Key Frame Scan Matching Method", Sensors, vol. 17, No. 5, May 7, 2017, pp. 1-29.
Koch Reinhard et al: "MixIn3D: 3D Mixed Reality with ToF-Camera",Sep. 9, 2009,Intelligent Virtual Agent. IVA 2015. LNCS; [Lecture Notes in Computer Science; Lect.Notes Computer], Springer, Berlin, Heidelberg, pp. 126-141.
BreedVision—A Multi-Sensor Platform for Non-Destructive Field-Based Phenotyping in Plant Breeding; Lucas Busemeyer, Publication date Feb. 27, 2013 (18 pages).
BBC Research & Development white paper WHP 007; Applications of depth METADATA; O.Grau, Publication date Sep. 1, 2001 (12 pages).
A Novel Real-Time Reference Key Frame Scan Matching Method;Haytham Mohamed;Publication date May 7, 2017 (29 pages).
Indian First Examination Report,Indian Application No. 201914033294, dated Mar. 31, 2021 (6 pages).
Australian First Examination Report Application 20193265974 dated Jun. 22, 2021. (3 pages).
Korean Office Action with English Translation for KR Application 10-2020-7030579 dated Jun. 28, 2021. (27 pages).

* cited by examiner

IMAGE PROCESSING METHOD, NON-TRANSITORY COMPUTER-READABLE STORAGE MEDIUM, AND ELECTRONIC APPARATUS

CROSS-REFERENCE TO RELATED APPLICATION(S)

This application claims priority to Chinese Patent Application No. 201810962707.9, filed on Aug. 22, 2018, the content of which is herein incorporated by reference in its entirety.

TECHNICAL FIELD

The present disclosure relates to the field of computers, and in particular, to an image processing method, a non-transitory computer-readable storage medium, and an electronic apparatus.

BACKGROUND

When shooting an object, an intelligent apparatus can capture not only color information of the object, but also depth information of the object. The color information of an image can be more accurately processed by using the depth information. For example, it is possible to identify a near view and a distant view in the image based on the depth information, thereby processing colors of the near view and the distant view in different ways. It is also possible to determine whether an identified human face is living based on the depth information, thereby performing beautifying processing on the living human face. There are a number of methods for capturing the depth information by using an image processing method, such as a binocular ranging method, a structured light method, a time of flight method, and the like.

However, a depth camera (a camera which can capture depth images, such as Time of Flight (TOF) camera) has a capturing frequency inconsistent with that of a visible light camera. Taking the TOF camera as an example, frame loss may be prone to appear in images captured by the TOF camera during a same exposure period. Once the frame loss occurs, the binocular calibration is inaccurate, and an image acquisition system has a poor stability.

SUMMARY

An image processing method for an electronic apparatus is provided. The method may include: acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information; and stitching the at least two second initial images into one depth image for further processing.

A non-transitory computer-readable storage medium storing a program which, when executed by a processor, cause the processor to perform an image processing method. The method comprises: acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information; and stitching the at least two second initial images into one depth image for further processing.

An electronic apparatus is provided. The electronic apparatus includes a non-transitory memory and a processor, wherein the non-transitory memory stores a computer program which, when executed by the processor, causes the processor to perform an image processing method. The method comprises: acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information; and stitching the at least two second initial images into one depth image for further processing.

BRIEF DESCRIPTION OF DRAWINGS

In order to describe the technical solutions in the embodiments of the present disclosure or a related art more clearly, the drawings required to be used in descriptions about the embodiments or the related art will be simply introduced below. It is apparent that the drawings described below are only some embodiments of the present disclosure. Other drawings may further be obtained by those of ordinary skilled in the art according to these drawings without creative work.

DETAILED DESCRIPTION

Figure 1:
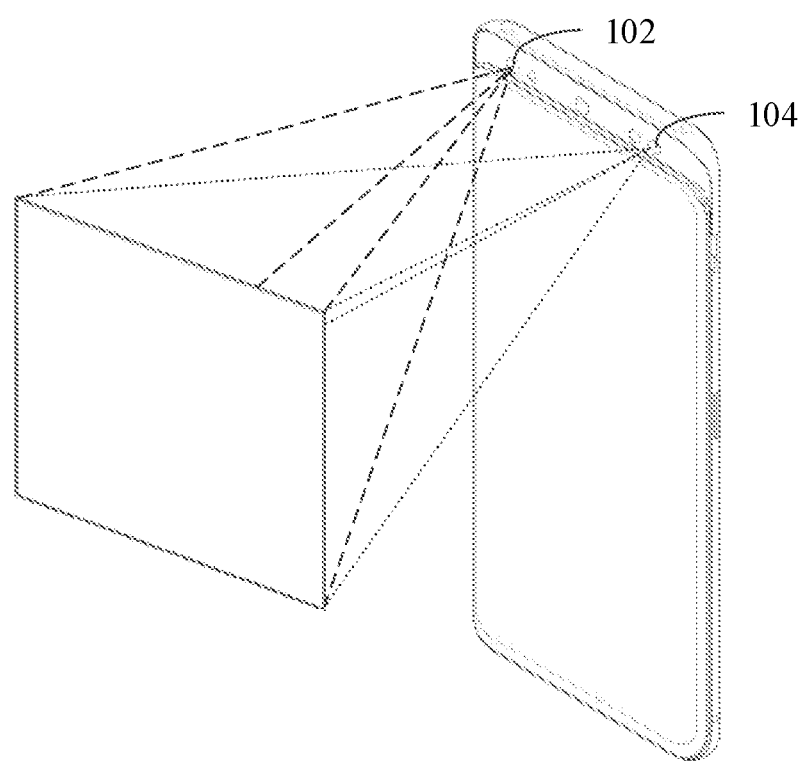
FIG. 1 is a view illustrating an applicable environment of an image processing method according to some embodiments of the present disclosure.

In order to make purposes, technical solutions, and advantages of the present disclosure clearer, the present disclosure will further be described below in combination with the drawings and the embodiments in detail. It should be understood that specific embodiments described herein are only used to explain the present disclosure and not intended to limit the present disclosure.

It can be understood that, terms "first", "second", and the like used in the disclosure may be configured in the present disclosure to describe various components, but not intended to limit these components. These terms are only used to distinguish a first component from another component. For example, without departing from the scope of the present disclosure, a first client may be referred as a second client. Similarly, the second client may be referred as the first client. The first client and the second client may both be clients but are not the same client.

In an aspect, an image processing method for an electronic apparatus may be provided. The method may include: acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information; and stitching the at least two second initial images into one depth image for further processing.

In some embodiments, each of the second initial images comprises image data and metadata corresponding to the image data. The stitching the at least two second initial images into one depth image, comprises: extracting the image data and the metadata of each of the second initial images; packaging the extracted image data and metadata; and storing the packaged image data and metadata in a depth format to generate the depth image.

In some embodiments, the packaging the extracted image data and metadata, comprises: stitching the image data and the corresponding metadata of the at least two initial images, or sequentially stitching the image data of the at least two second initial images based on the exposure timing.

In some embodiments, at least one of the at least two second initial images is a key frame, and at least one of the at least two second initial images is a non-key frame. The packaging the extracted image data and metadata, comprises: calculating a phase difference between a pixel point in the key frame and a corresponding pixel point in the non-key frame; and extracting the image data and the metadata of the key frame, and packaging the calculated phase difference and the image data and metadata of the key frame.

In some embodiments, the metadata is configured to indicate a sequence of acquiring the second initial images. The stitching the at least two second initial images into one depth image, comprises: determining, according to the metadata, whether at least one of the at least two second initial images is lost; based on a determination that none of the second initial images is lost, packaging the second initial images and corresponding identification information; and synthesizing, according to the identification information, the packaged second initial images into the depth image.

In some embodiments, the acquiring the at least two second initial images by the second camera at the second frame rate during the exposure period, comprises: controlling a laser emitter to emit at least two laser waves at the second frame rate during the exposure period, wherein each of the at least two laser waves is reflected by an object such that a reflected laser wave is formed; and acquiring, by the second camera, the at least two second initial images generated by the reflected laser wave during the exposure period.

In some embodiments, after acquiring the at least two second initial images by the second camera at the second frame rate during the exposure period, the method further comprises: calculating the depth information corresponding to the at least two second initial images by using a time difference method or a phase difference method.

In some embodiments, the acquiring the first initial image by the first camera at the first frame rate during the exposure period and acquiring at least two second initial images by the second camera at the second frame rate during the exposure period, comprises: when an image-capturing instruction is detected, acquiring the first initial image by the first camera at the first frame rate during the exposure period; acquiring the number of the second initial images, and calculating the second frame rate according to the number of the second initial images and the first frame rate; and acquiring the second initial images by the second camera at the calculated second frame rate during the exposure period.

In some embodiments, the acquiring the number of the second initial images, comprises one of: acquiring a preset number of second initial images; acquiring an application level corresponding to an application identifier included in the image-capturing instruction, and acquiring the corresponding number of the second initial images according to the application level; and acquiring jitter data of the electronic apparatus, and acquiring the corresponding number of the second initial images according to the jitter data.

In some embodiments, after acquiring the first initial image by the first camera at the first frame rate during the exposure period and acquiring at least two second initial images by the second camera at the second frame rate during the exposure period, the method further comprises: acquiring a first time point at which the first initial image is captured and a second time point at which each of the second initial images is captured; determining whether a time interval between the first time point and the second time point is less than an interval threshold; based on a determination that the time interval between the first time point and the second time point is not less than the interval threshold, discarding the first initial image and the at least two initial images.

In some embodiments, the method may further include: performing a first format conversion on the first initial image to generate a first target image. The depth image and the first target image synchronously correspond to each other in timing. The stitching the at least two second initial images into one depth image may include: packaging the at least two second initial images; and performing a second format conversion on the packaged second initial images to generate the depth image.

In some embodiments, method may further include: identifying a target object in the first target image; acquiring, according to the depth image, target depth information corresponding to the target object; and performing, according to the target depth information, processing on the target object.

In some embodiments, after performing the first format conversion on the first initial image to generate the first target image, and before identifying the target object in the first target image, the method further comprises: packaging the first target image and the depth image; encrypting the packaged first target image and depth image when an application having a level greater than a threshold; and transmitting the encrypted first target image and depth image to the application.

In another aspect, a non-transitory computer-readable storage medium may be provided. The non-transitory computer-readable storage medium stores a program which, when executed by a processor, cause the processor to perform an image processing method. The method comprises: acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information; and stitching the at least two second initial images into one depth image for further processing.

In some embodiments, each of the second initial images comprises image data and metadata corresponding to the image data. The packaging the at least two second initial images and performing the format conversion on the packaged second initial images to generate one depth image, comprises: extracting the image data and the metadata of each of the second initial images; packaging the extracted image data and metadata; and storing the packaged image data and metadata in a depth format to generate the depth image.

In some embodiments, at least one of the at least two second initial images is a key frame, and at least one of the at least two second initial images is a non-key frame. The packaging the extracted image data and metadata, comprises: calculating a phase difference between a pixel point in the key frame and a corresponding pixel point in the non-key frame; and extracting the image data and the metadata of the key frame, and packaging the calculated phase difference and the image data and metadata of the key frame. Or, the packaging the extracted image data and metadata, comprises: stitching the image data and the corresponding metadata of the at least two initial images, or sequentially stitching the image data of the at least two second initial images based on the exposure timing.

In some embodiments, the metadata is configured to indicate a sequence of acquiring the second initial images. The packaging the at least two second initial images and performing a format conversion on the packaged second initial images to generate one depth image, comprises: determining, according to the metadata, whether at least one of the at least two second initial images is lost; based on a determination that none of the second initial images is lost, packaging the second initial images and corresponding identification information; and synthesizing, according to the identification information, the packaged second initial images into the depth image.

In some embodiments, after the acquiring the first initial image by the first camera at the first frame rate during the exposure period and acquiring at least two second initial images by the second camera at the second frame rate during the exposure period and before the packaging the at least two second initial images and performing the format conversion on the packaged second initial images to generate one depth image, the method further comprises: acquiring a first time point at which the first initial image is captured and a second time point at which each of the second initial images is captured; determining whether a time interval between the first time point and the second time point is less than an interval threshold; based on a determination that the time interval between the first time point and the second time point is not less than the interval threshold, discarding the first initial image and the at least two initial images.

In a further aspect, an electronic apparatus may be provided. The electronic apparatus may include a non-transitory memory and a processor. The non-transitory memory stores a computer program which, when executed by the processor, causes the processor to perform an image processing method. The method comprises: acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information; and stitching the at least two second initial images into one depth image for further processing.

In some embodiments, the acquiring the first initial image by the first camera at the first frame rate during the exposure period and acquiring at least two second initial images by the second camera at the second frame rate during the exposure period, comprises: when an image-capturing instruction is detected, acquiring the first initial image captured by the first camera at the first frame rate during the exposure period; acquiring the number of the second initial images, and calculating the second frame rate according to the number of the second initial images and the first frame rate; and acquiring the second initial images having the corresponding number by the second camera at the calculated second frame rate during the exposure period.

In some embodiments, after the acquiring the first initial image by the first camera at the first frame rate during the exposure period and acquiring at least two second initial images by the second camera at the second frame rate during the exposure period and before the stitching the at least two second initial images into one depth image, the method further comprises: acquiring a first time point at which the first initial image is acquired and a second time point at which each of the second initial images is acquired; determining whether a time interval between the first time point and the second time point is less than an interval threshold; based on a determination that the time interval between the first time point and the second time point is not less than the interval threshold, discarding the first initial image and the at least two initial images.

FIG. 1 is a view illustrating an applicable environment of an image processing method according to some embodiments of the present disclosure. As shown in FIG. 1, two cameras may be mounted on an electronic apparatus 10. In some embodiments, the two cameras may include a first camera 102 and a second camera 104. More specifically, the electronic apparatus 10 may perform shooting by using the first camera 102 and the second camera 104. More specifically, a first initial image may be acquired by the first camera 102 at a first frame rate during an exposure period, and at least two second initial images may be acquired by the second camera 104 at a second frame rate during the exposure period. In some embodiments, the first frame rate may be less than the second frame rate. Then, a first target image may be generated based on the first initial image, and a second target image (also called as "depth image" hereafter) may be generated based on the second initial image. In some embodiments, the depth image may be configured to indicate depth information corresponding to the first target image. Processing may be performed based on the first target image and the depth image. It can be understood that, the electronic apparatus 10 may be a mobile phone, a computer, a wearable device, and the like, and may not be limited herein. In some embodiments, the first camera may be a visible light camera (also referred as an RGB camera), such as a Charge Coupled Device (CCD) or a Complementary Metal-Oxide-Semiconductor (CMOS) camera. The second camera may be a laser-type time of flight (TOF) camera. The second camera may collect the depth information of a target object (that is, information of distance from the camera and to the target object).

Time of Flight (TOF) technique may be used in Light Detection and Ranging (LIDAR) for high precision distance measurement. The TOF technique is based on measuring the time required for lights emitted by a lighting unit to travel to the target object and return back to a detector. Currently, according to this principle, TOF distance measurement, that is, a TOF camera, has been achieved in standard CMOS or CCD technology. The TOF camera may also be referred as a range image (RIM) sensor. Unlike other 3D system, the TOF camera has become a new generation of cameras that collects the distance of the target object (that is, depth information). Currently, the TOF technique may be achieved by two methods. The first method may utilize modulated incoherent light and perform a phase-based measurement, which may also be called as a phase difference method. The second method may calculate the distance of the target object according to the time difference based on continuous transmission and reception of pulse signals, which may also be called as a time difference method.

Figure 2:
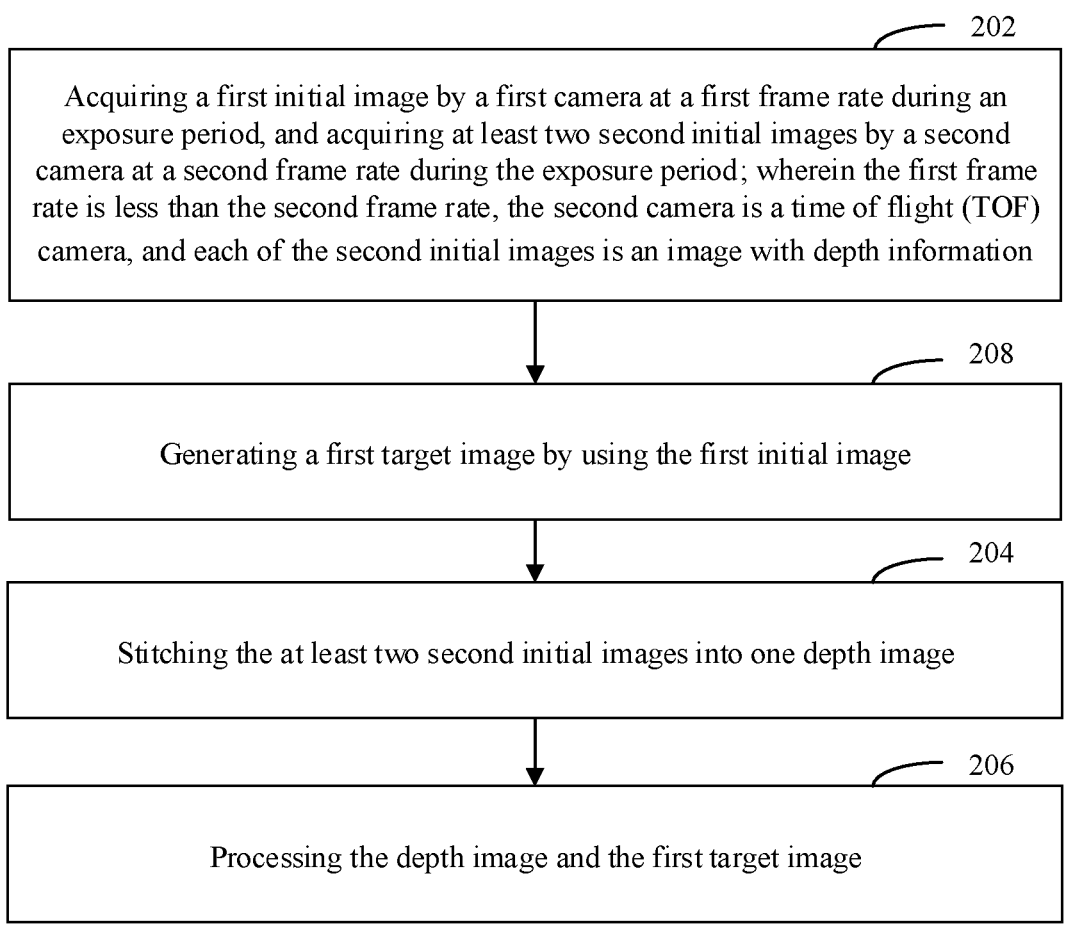
FIG. 2 is a flow chart of an image processing method according to some embodiments of the present disclosure.
Figure 3:
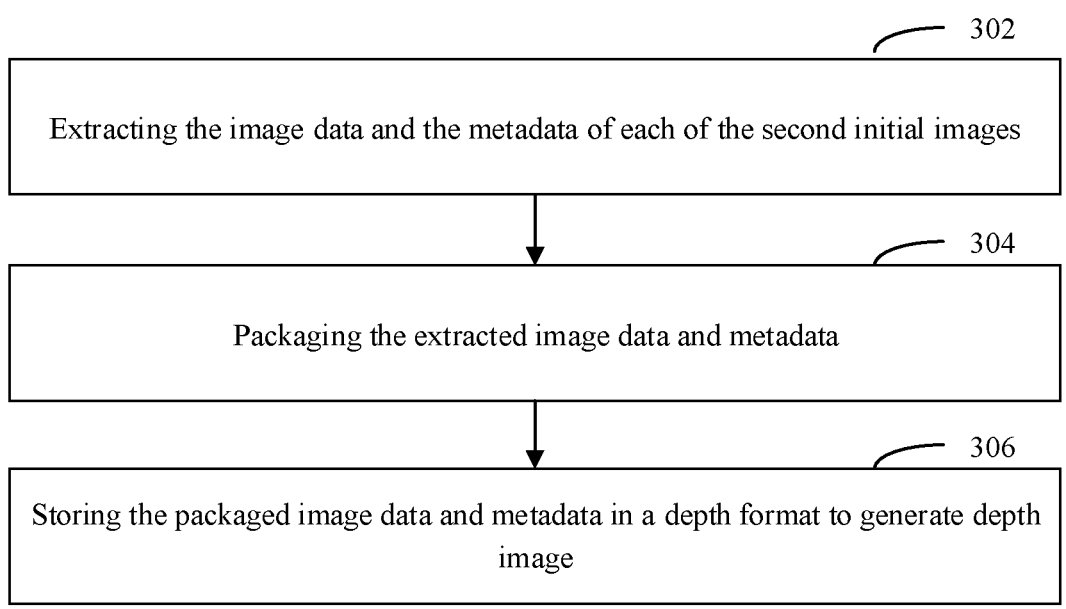
FIG. 3 is a flow chart of an image processing method according to some embodiments of the present disclosure.

FIG. 2 is a flow chart of an image processing method according to some embodiments of the present disclosure. As shown in FIG. 2, the image processing method may include actions/operations executed by blocks 202 to 208.

At block 202, a first initial image may be acquired by a first camera at a first frame rate during an exposure period, and at least two second initial images may be acquired by the second camera at a second frame rate during the exposure period. In some embodiments, the first frame rate may be less than the second frame rate. The second camera may be a TOF camera (which is one type of a depth camera configured to capture depth images), and each of the second initial images may be a depth image with depth information. Of course, in some embodiments, the second camera may also be other types of depth cameras, such as the depth camera based on a binocular ranging method or a structured light method.

A camera may be mounted on the electronic apparatus, and images may be acquired by the mounted camera. The camera may be divided into a laser camera, a visible light camera, and the like, according to different acquired images. The laser camera may acquire an image formed by irradiating laser onto the object, and the visible image may acquire an image formed by irradiating visible light onto the object. Several cameras may be mounted on the electronic apparatus, and locations for mounting the cameras may not be limited herein. For example, in some embodiments, a camera may be mounted on a front panel of the electronic apparatus, and two cameras may be mounted on a back panel. The camera may also be embedded in an interior of the electronic apparatus, and then the camera may be turned on by means of rotating or sliding. More specifically, a front camera and a rear camera may be mounted on the electronic apparatus. The front camera and the rear camera may acquire images from different viewing angles, respectively. In general, the front camera may acquire an image from a front viewing angle of the electronic apparatus, and the rear camera may acquire an image from a back viewing angle of the electronic apparatus.

In some embodiments of the present disclosure, at least two cameras may be mounted on the electronic apparatus. The at least two cameras may include a first camera and a second camera. The first camera and the second camera may be controlled to expose simultaneously, such that a first initial image may be acquired by the first camera, and a second initial image may be acquired by the second camera. It may be understood that both the first camera and the second camera may acquire images for the same scene. The first camera may acquire the first initial image at the first frame rate, and the second camera may acquire the second initial image at the second frame rate. In some embodiments, the first frame rate may be less than the second frame rate, such that the second camera may acquire a plurality of second initial images during the same exposure period.

More specifically, the at least two second initial images captured by the second camera may be used to synthesize into one image. In this way, it is possible to avoid the void phenomenon generated by the second camera when capturing the second initial images, and an accuracy of the images may be improved. For example, the first camera may acquire the first initial image at a rate of 30 frames per second, and the second camera may acquire the second initial image at a rate of 120 frames per second. Thus, the first camera captures one first initial image and the second camera acquires four second initial images during the same exposure period. It should be noted that the frame rate at which the second camera captures the second initial images may be adjustable. When the second frame rate is greater than 120 frames per second, N (N>4) second initial images may be captured by the second camera during the same exposure period. The embodiments of the present disclosure may not provide limitations thereto.

More specifically, the first initial image may refer to an initial image captured by the first camera, and the second initial images may refer to initial images captured by the second camera. An image sensor in the camera may convert an optical signal into an electrical signal. After the optical signal is converted into the electrical signal, the generated initial image may not be directly processed by the processor, and may need to be converted in a certain format before being processed by the processor.

In some embodiments, the first camera may be a visible light camera, and the second camera may be a laser camera. A laser emitter corresponding to the second camera may be mounted on the electronic apparatus. Laser emitted from the laser emitter may be irradiated onto the object, and the second initial image may be generated when the laser is irradiated onto the object. The second initial image may be acquired by the second camera. The second initial image may be configured to generate depth information corresponding to the first initial image.

In some embodiments, the image processing method may further include actions executed by a block 208.

At the block 208, the first target image may be generated by using the first initial image. More specifically, the block 208 may include operations as follow: performing a first format conversion on the first initial image to generate a first target image, that is, the first target image may be processed by the processor as described above. In some embodiments, the depth image and the first target image may synchronously correspond to each other in timing.

The first initial image captured by the first camera may generate the corresponding first target image which is capable of being processed by the processor. For example, the acquired first initial image may be an image in a RAW format, and may be converted from a RAW format to a YUV (Luma Chrominance Chroma) format. The YUV image generated after the format conversion is the generated first target image, and the first target image may be further processed. The second initial image captured by the second camera may also be an image in RAW format. Since at least two second initial images are acquired, the second initial images may be synthesized into one Depth image, that is, the depth image (also called as a second target image).

At block 204, the at least two second initial images may be stitched into one depth image.

In some embodiments, during the same exposure period, the TOF camera may have a higher frame rate than that of the first camera, such that the number of second initial images captured by the TOF camera may be greater than the number of first initial images captured by the first camera. For example, in the above example, the first frame rate may be 30 frames per second, and the second frame rate may be 120 frames per second. During the same exposure period (for example, 1/30 second), the first camera acquires one first initial image, and the second camera (TOF camera) may simultaneously acquire four second initial images. However, since the TOF camera at a higher frame rate captures four second initial images, while the first camera captures one first initial image, which means the number of the second initial images captured by the TOF camera is not inconsistent with the number of first initial images captured by the first camera, the problem of frame loss of the TOF images may easily occur. In terms of binocular calibration, frame loss means that the timing is not synchronized, which will have a great impact on the later binocular calibration and even on the 3D modeling of the target object in an application layer, thereby resulting in instability of an image recognition system.

Based on this, it is necessary to stitch the plurality of second initial images to generate one depth image. That is to say, the plurality of second initial images may be stitched into one depth image. The depth image and the first target image may synchronously correspond to each other in timing. Thus, it is convenient to perform the binocular calibration, obtain one image and the corresponding depth information, and provide foundation to subsequent 3D modeling and 3D applications.

It should be noted that each of the second initial images is a image including the depth information, and the depth image may be an image generated by stitching the plurality of second initial images into one image, and the depth image may further include a plurality of depth information. The depth image may be configured for image synthesis with RGB (Red Green Blue) image acquired by the first camera in the subsequent image processing, and an RGB image with depth information, that is, an RGBD (Red Green Blue Depth) image may be generated.

The second initial image may include image data and metadata corresponding to the image data. The image data may also be referred as RAW Data, and the metadata may also be referred as META Data. The RAW format is a format commonly used in the field of image processing. The RAW format may be configured to indicate initial image data that is initially captured, that is, the initial data that has not been subject to subsequent image processing. The META Data may be the data indicating attributes of the current RAW Data, such as the exposure period of the current image, a focal length, and the like. In some embodiments, at the block 204, stitching the at least two second initial images into the depth image may include actions/operations executed by the following blocks.

At block 302, the image data and the metadata in each of the second initial images may be extracted.

At block 304, the extracted image data and metadata may be packaged.

The block 304 may be specifically include: stitching the image data and the corresponding metadata of the at least two second initial images respectively, or sequentially stitching the image data of the at least two second initial images according to an exposure timing.

For example, when four second initial images are captured during the same exposure period and each of the second initial images is cached in the TOF image format, the image data and the metadata of the four images (second initial images) may be extracted (the TOF image format may include the image data of the payload and additional information of the non-payload, and the non-payload data are needed to be filtered at this time), and the image data and the metadata of each of the four second initial images may be stitched sequentially in order to achieve the data stitching. That is, the image data of the first image, the second image, the third image, and the fourth image may be sequentially stitched with each other. The last bit of the image date of the first image may be stitched to the first bit of the image date of the second image, the last bit of the image date of the second image may be stitched to the first bit of the image date of the third image, and so on, until the last bit of the image date of the last image is stitched. In some embodiments, when the four second initial images are stitched (synthesized) into one image, data stitching may be performed according to a specific depth image format, or may be performed according to a specific format or protocol. For example, it is possible to arrange the Raw data and Meta data alternately (that is, the data may be arranged in an order, such that the Raw data of one image is followed by the corresponding Meta data of the same image, and then followed by the Raw data of the next image, the Meta data of the next image corresponding to the Raw data of the next image, and so on). The data stitching will not be repeated in the embodiments of the present disclosure.

It should be noted that, in some embodiments of the present disclosure, the at least two second initial images may be acquired by using the time difference method or the phase difference method. When using the phase difference method, at least one of the captured at least two second initial images may be configured as a key frame, and at least one of the captured at least two second initial images may be configured as a non-key frame. In this case, the block 304 may include actions/operations executed by the following blocks.

Phase difference data between a pixel point in the key frame and a corresponding pixel point in the non-key frame may be calculated.

The image data and the metadata of the key frame may be extracted, and the calculated phase difference data and the image data and metadata of the key frame may be packaged.

In some embodiments, the phase difference calculation method may be as described above. After acquiring the image data and the metadata of the key frame, only the phase difference in the non-key frame needs to be calculated. A phase of the pixel point in the non-key frame may be compared with a phase of the corresponding pixel point in the key frame, such that the difference may be calculated. In this way, the phase difference of the non-key frame may be calculated, such that it is unnecessary to retain all the image data and metadata of the four second initial images. Instead, only the image data and the metadata of the key frame and the phase difference data between the pixel point in the non-key frame and the corresponding pixel point in the key frame may be retained, thereby further saving storage space.

In some embodiments, the metadata may be configured to indicate a sequence of capturing the second initial images. The block of stitching the at least two second initial images into one depth image may specifically include operations executed by the following.

Whether at least one of the captured second initial images is lost is determined according to the metadata. Based on the determination that no captured second initial image is lost, the second initial images and corresponding identification information may be packaged.

The packaged second initial images may be synthesized into the depth image according to the identification information.

In some embodiments, at least two second initial images may be captured by the second camera. Thus, after the second camera captures the second initial images, corresponding identification information may be generated corresponding to each of the second initial images, and the capturing sequence of the second initial images may be marked by the identification information. More specifically, the identification information may be, but not limited to, capturing moments of the second initial images, phases of the second initial images, and the like. The capturing moments of the second initial images may be configured to indicate moments at which the second initial images are captured. According to the capturing moments, it is possible to determine a time sequence in which the second initial images are captured. The phase of the second initial image may indicate a sequence of capturing each of the second initial images. For example, the second initial images may be marked with serial numbers as "01", "02", "03" and "04" according to the sequence of the capturing moments. The packaged second initial images may be sequentially synthesized into one depth image according to the identification information.

At block 306, the packaged image data and metadata may be stored in a depth format to generate the depth image. In some embodiments, the stored image data and metadata may be data of the depth image.

At the block 306, one depth image may be constructed, and the depth image may be null and initially contain no data therein. The corresponding packaged data (image data and metadata) may be sequentially written into the data of the depth image to generate one depth image having complete data. The depth image may be stored in a buffer area. For example, each of the four second initial images captured by the TOF camera may have a resolution of 240×180. After packaging the image data and the metadata and storing in the depth format, the stored depth image may have a resolution of 960×720. Herein, apparently, the stored depth image may have a resolution multiple times of each of the second initials images, and the times may be the number of the second initial images.

At block 206, the depth image and a first target image may be further processed.

It should be understood that the first camera and the second camera may perform shooting for a same scene, such that the first initial image and the second initial images acquired by the shooting may correspond to each other, and the acquired first target image and depth image may also correspond to each other. For example, the first target image may be a YUV image and the depth image may be a Depth image. Thus, the first target image may be configured to indicate color information of the shooting scene, and the depth image may be configured to indicate depth information corresponding to the shooting scene.

After the first target image and the depth image are acquired, the first target image and the depth image may be processed, and specific processing method will not be limited herein. For example, human face recognition processing may be performed according to the first target image, and the human face recognized in the first target image may be subjected to three-dimensional modeling according to the depth image, to acquire a three-dimensional model of the human face. It is also possible to perform beautifying processing on the human face in the first target image according to the depth information in the depth image.

In the image processing method provided by the above embodiments, the first camera may capture the first initial image at the first frame rate during a given exposure period, and the second camera may capture at least two second initial images at the second frame rate during the exposure period. The processing may be further performed according to the first target image generated from the first initial image and the depth image generated from the second initial images. In this way, it is possible to ensure that the first camera and the second camera may acquire the images in the same exposure period. Besides, the second camera may simultaneously acquire at least two second initial images, and generate the final depth image for further processing according to the at least two second initial images. Thus, the errors generated during the capturing of images may be reduced, and the accuracy of image processing may be improved.

In the image processing method provided by the above embodiments, it is possible to acquire the first initial image and a plurality of second initial images during the same exposure period. After that, the plurality of second initial images may be stitched into one depth image. The first target image and the one depth image may be further processed. Compared with the TOF camera in the related art, frame loss may be less prone to occur in the image processing method according to some embodiments of the present disclosure, thereby improving the stability of the image processing system.

Herein, the block 208 may be performed before or after the block 204, or performed at the same time with the block 204. The present disclosure will not limit to the executing time of the block 208.

Figure 4:
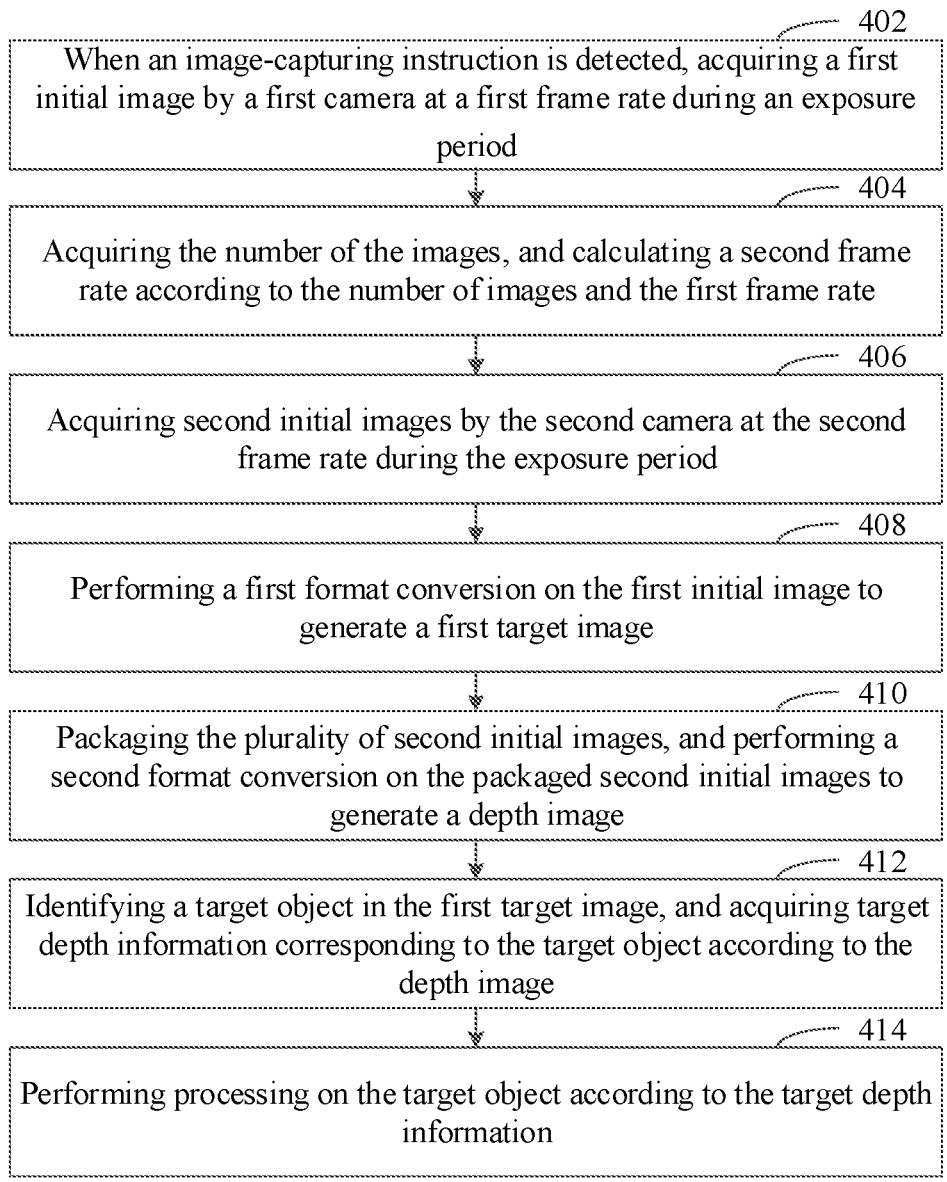
FIG. 4 is a flow chart of an image processing method according to some embodiments of the present disclosure.

FIG. 4 is a flow chart of an image processing method according to some embodiments of the present disclosure. As shown in FIG. 4, the image processing method may include actions/operations executed by blocks 402 to 414. Herein, the blocks 402 to 406 may belong to the block 202 as described above. That is to say, the block 202 may include actions executed by the blocks 402 to 406. Besides, the block 204 may include actions executed by the blocks 408 and 410, and the block 206 may include actions executed by the blocks 412 and 414.

At block 402, when an image-capturing instruction is detected, a first initial image may be acquired by a first camera at a first frame rate during an exposure period.

The image-capturing instruction may refer to an instruction that triggers an image capturing operation. For example, a user may open an application, and the image-capturing instruction may be generated by operating the application. When the electronic apparatus has detected the image-capturing instruction, the camera may be turned on. After the camera is turned on, a period during which lights are projected onto a light receiving surface of the camera may be controlled by controlling a period during which a shutter is opened. When the shutter is opened for a longer period of time, more lights are incident into the camera, and the generated image may have higher brightness. For example, when the ambient light is bright, the shutter is generally controlled to open for a short period of time, such that a small number of lights are incident into the camera, and thus it is possible to avoid the generated image from being too bright.

The exposure period may refer to a period of time during which the shutter of the camera is controlled to be opened. The time moment at which the shutter is opened and the period of time during which the shutter is opened may be acquired according to the exposure period. For example, when the exposure period is "12:00:00→12:00:30", it means that the shutter is opened at "12:00:00" for 30 seconds. The frame rate may refer to a frequency at which the camera captures images. More specifically, the frame rate may refer to the number of images captured by the camera per second. For example, the frame rate may be 30 frames per second, which means that the camera may be controlled to capture 30 images per second.

In some embodiments of the present disclosure, in order to ensure that the images captured by the first camera and the images captured by second camera correspond to each other, it is necessary to control that the first camera and the second camera are simultaneously exposed. The number of first initial images captured by the first camera may be different from the number of second initial images captured by the second camera. Accordingly, the first camera and the second camera may capture images at different frame rates during the same exposure period, such that the first camera and the second camera may capture different numbers of images during the same exposure period.

At block 404, the number of the images may be acquired, and a second frame rate may be calculated according to the number of images and the first frame rate. Herein, the number of images may refer to the number of the second initial images that need to be captured.

More specifically, the frame rates at which the first camera and the second camera capture the images may be preset or may be changed in real time. The frame rates will not be limited herein. For example, the first frame rate may be preset, and the second frame rate may be changed in real time. It is also possible that, the first frame rate and the second frame rate are both preset.

In some embodiments, the second frame rate may be calculated at the first frame rate. First, the number of the second initial images may be acquired, and then the second frame rate may be calculated according to the number of second initial images and the first frame rate. Assuming that the number of the second initial images is S and the first frame rate is Z1, the second frame rate Z2 may be calculated by using a formula as follow: Z2=S*Z1. That is, the second frame rate may be multiple of the first frame rate, and the multiple may be equal to the number of the second initial images. For example, when the first frame rate is 30 frames per second and the number of images (that is, the number of the second initial images) is 4, the second frame rate is 30*4=120 frames per second.

In some embodiments, the number of second initial images may be preset or acquired according to the image-capturing instruction. Acquiring the number of the second initial images may include the following operations: acquiring a preset number of images; or acquiring an application level corresponding to an application identifier included in the image-capturing instruction, and acquiring the corresponding number of images according to the application level.

The application identifier may be configured to indicate an application that initiates the image-capturing instruction described above. The application level may be configured to indicate an importance level of the application that initiates the image-capturing instruction. For example, a third-party application may have a lower application level, while a system application may have a higher application level. The electronic apparatus may pre-establish a correspondence between the application identifiers and the application levels, and the corresponding application level may be found according to the application identifier. The higher the application level, the greater the number of second initial images.

In some embodiments, the number of second initial images may also be acquired according to jitter conditions of the electronic apparatus. Generally, when the electronic apparatus has a great jitter, it is considered that errors may be more likely to occur when the electronic apparatus is acquiring an image. Therefore, the errors of images may be reduced by acquiring and synthesizing multiple images. More specifically, the electronic apparatus may pre-establish a correspondence between jitter data and the number of images. During the process of acquiring the image, the jitter data of the electronic apparatus may be acquired, and the corresponding number of the images may be acquired according to the jitter data. The jitter data may be configured to indicate the jitter conditions of the electronic apparatus, and may be data detected by a sensor such as a gyroscope, an acceleration sensor, and the like, which is not limited herein.

At block 406, second initial images may be acquired by the second camera at the second frame rate during the exposure period. The number of the second initial images may correspond to the number of images as previously described.

When the image-capturing instruction is detected, it is necessary to simultaneously expose the first camera and the second camera, and to ensure that different numbers of images are acquired by the first camera and the second camera during the same exposure period, respectively. Therefore, after detecting the image-capturing instruction, the electronic apparatus may control the first camera to capture the first initial image at the first frame rate, and control the second camera to capture the second initial image at the second frame rate.

To ensure that the acquired first initial images corresponds to the second initial images, after acquiring the first initial image and the second initial image and before stitching the second initial images into one depth image, a first time point at which the first target image is captured and a second time point at which the second initial image is captured may be acquired, respectively. When a time interval between the first time point and the second time point is less than an interval threshold, the action of stitching the plurality of second initial images into one depth image may be executed. Otherwise, the captured first initial image and the second initial images do not correspond to each other, and the captured first initial image and the second initial images may be discarded.

At block 408, a first format conversion may be performed on the first initial mage to generate a first target image.

The camera may be composed of an optical element and an image sensor. The optical element may be configured to collect light rays. The image sensor may include a color filter array (such as a Bayer filter), and may be configured to convert light intensity and wavelength information of the light rays collected by the optical element into an electrical signal and then to generate an initial image. The first initial image may be the initial image captured by the first camera. The first format conversion may be performed on the first initial image to generate the first target image.

In some embodiments, the first camera may be a visible light camera. The first initial image may be an image in a RAW format. The first target image may be an image in a YUV format. The first format conversion may be performed on the first initial image in the RAW format, such that the first target image in the YUV format may be acquired.

At block 410, the plurality of second initial images may be packaged, and a second format conversion may be performed on the packaged second initial images to generate one depth image.

After the image-capturing instruction is detected, the second camera may acquire the second initial images at the second frame rate during the same exposure period, and the second initial images having the number corresponding to the number of images may be acquired. The second initial images captured by the second camera may also be the initial images. Thus, the final target image may be acquired after a certain format conversion. More specifically, after the second initial images are acquired, in order to prevent the second initial images from being lost during the transmission, the second initial images may be packaged, such that the second initial images may be transmitted as a whole in the memory to reduce frame loss. The second format conversion may be performed on the packaged second initial images, and then the depth image may be generated.

In some embodiments, the second camera may be a laser camera. A laser emitter may be mounted on the electronic apparatus. The laser emitter may be configured to emit laser waves at a certain frequency. The laser waves may be reflected by the object and then captured by the second camera to generate the second initial images. Then, by calculating Time of Flight (TOF) of the laser waves, it is possible to calculate a distance from the object to the second camera.

More specifically, the laser emitter may be controlled to emit laser waves during the exposure period. At least two shutters of the second camera may be controlled to be switched on and off at the second frame rate, and at least two second initial images generated by reflection of the laser waves when the shutters are switched on may be acquired. The second camera may capture different second initial images via different shutters. The second initial images captured by the TOF camera may also be images in RAW format. The depth image may be an image in Depth format. The second format conversion may be performed on the second initial images in RAW format to acquire the depth image in the Depth format.

Figure 5:
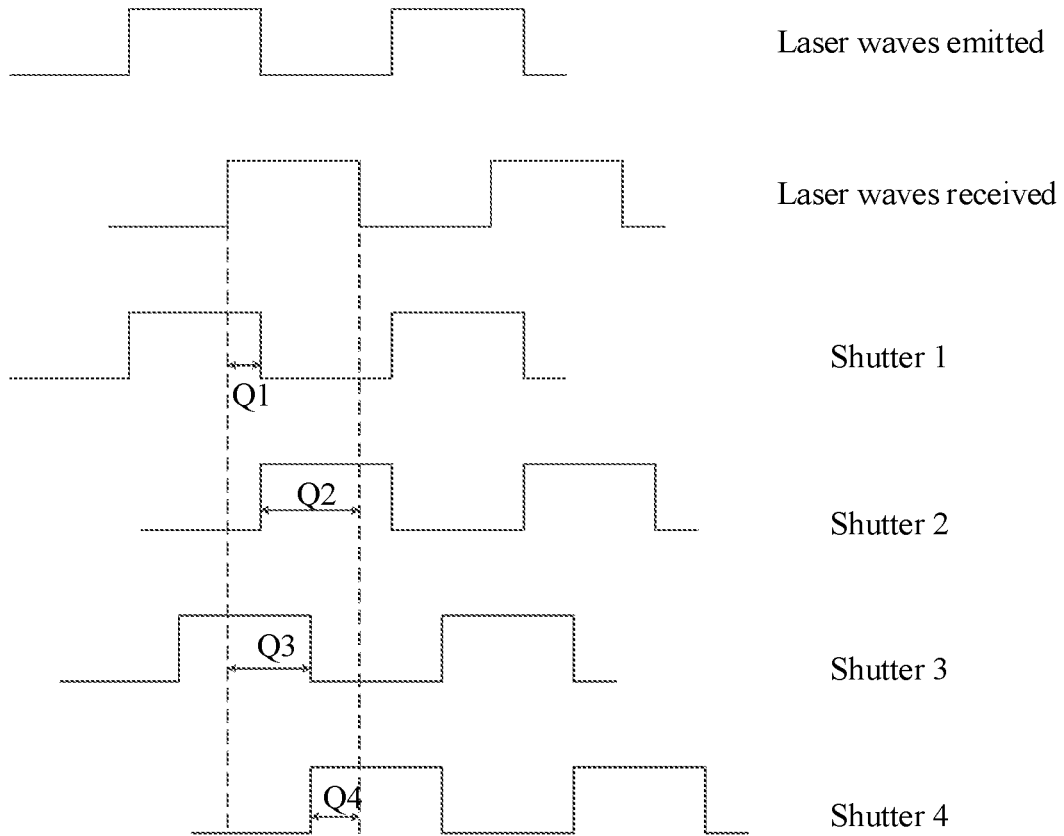
FIG. 5 is a schematic view showing a principle of calculating depth information by TOF according to some embodiments of the present disclosure.
Figure 6:
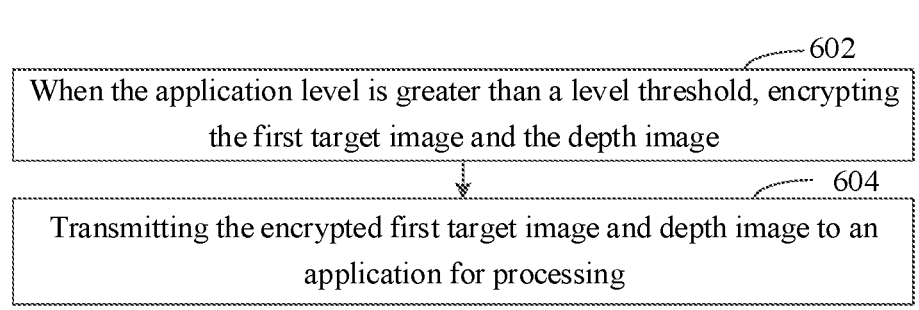
FIG. 6 is a flow chart of an image processing method according to some embodiments of the present disclosure.
Figure 7:
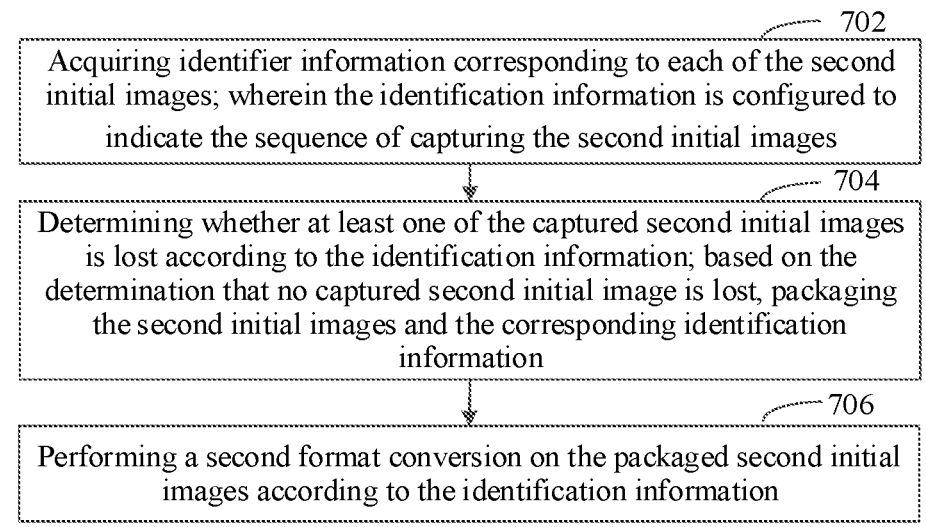
FIG. 7 is a flow chart of an image processing method according to some embodiments of the present disclosure.

FIG. 5 is a schematic view showing a principle of calculating depth information by TOF according to some embodiments of the present disclosure. As shown in FIG. 5, the laser emitter may emit a laser wave, and the emitted laser wave may be reflected by an object to form a reflected laser wave. The depth information of the object may be calculated according to a phase difference between the emitted laser wave and the received (reflected) laser wave. When the laser camera actually captures images, different shutters may be controlled to be switched on and off at different moments, and different received signals may then be generated, such that different images may be captured by switching on and off multiple shutters to calculate the depth image. In some embodiments, it is assumed that the laser camera controls the receiving of the laser wave signals by using four shutters, and the laser wave signals received by shutter 1, shutter 2, shutter 3, and shutter 4 are Q1, Q2, Q3, and Q4, respectively. Thus, a formula for calculating the depth information may be as follows.

$$D = \frac{C}{4\pi f} \tan^{-1} \frac{(Q_3 - Q_4)}{(Q_1 - Q_2)}$$

Herein, C is a speed of light, and f is an emission frequency of the laser wave.

At block 412, a target object in the first target image may be identified, and target depth information corresponding to the target object may be acquired according to the depth image.

After the first target image and the depth image are acquired, the first target image and the depth image may be packaged, and then the first target image and the depth image may be transmitted to the application to reduce loss of image data. For example, when the first target image is an RGB (Red Green Blue) image and the depth image is a Depth image, the first target image and the depth image may be packaged into an RGBD (Red Green Blue Depth) image and further transmitted to the application.

After the application receives the first target image and the depth image, the target object in the first target image may be identified. The depth image may be configured to indicate the depth information corresponding to the first target image. Thus, it is possible to acquire the target depth information corresponding to the target object in the first target image according to the depth image. More specifically, the identified target object in the first target image may be a target area including a plurality of pixel points. According to the target area, a corresponding target depth area in the depth image may be oriented, and the depth information corresponding to each pixel in the target area may be acquired according to the target depth area.

In some embodiments of the present disclosure, the method of identifying the target object may not be limited herein. For example, when the target object is a human face, the human face in the first target image may be identified by the human face detection algorithm. The target object may also be a building, a plant, an animal, and the like, which may be identified by artificial intelligence.

At block 414, processing may be performed on the target object according to the target depth information.

After the target depth information corresponding to the target object is acquired, the target object may be processed according to the target depth information. For example, three-dimensional modeling may be performed to the target object according to the target depth information. However, the target object may also be beautified according to the target depth information. The specific processing manners may not be limited herein.

In some embodiments, after acquiring the first target image and the depth image, and before identifying the target object in the first target image, the method may further include operations executed by the following blocks.

At block 602, when the application level is greater than a level threshold, the first target image and the depth image may be encrypted.

After the first target image and the depth image are acquired, the first target image and the depth image may be transmitted to the application for further processing. Before transmitting the first target image and the depth image, it is possible to determine whether the application level of the application is greater than the level threshold. Based on a determination that the application level of the application is greater than the level threshold, it indicates that the application has a higher security requirement, and the first target image and the depth image may be encrypted. However, based on a determination that the application level of the application is not greater than the level threshold, it indicates that the application has a lower security requirement, and the first target image and the depth image may be directly transmitted to the application.

At block 604, the encrypted first target image and depth image may be further transmitted to the application for processing.

The encrypted first target image and depth image may be further transmitted to the application for processing. After receiving the encrypted first target image and depth image, the application may decrypt the encrypted first target image and depth image, and perform next processing or operation on the decrypted first target image and depth image.

Before encrypting the first target image and the depth image, the first target image and the depth image may also be packaged, and then the packaged first target image and depth image may be encrypted, such that it is possible to reduce the frame loss of the first target image and the depth image during the transmission process.

In some embodiments, when the second camera captures the second initial image, identification information corresponding to each of the second initial images may also be generated. The identification information may be configured to identify the sequence of capturing the second initial image. More specifically, performing a format conversion on the second initial image may further include operations executed by the following blocks.

At block 702, identifier information corresponding to each of the second initial images may be acquired. In some embodiments, the identification information may be configured to indicate the sequence of capturing the second initial images.

The second camera may capture at least two second initial images. Thus, after the second camera captures the second initial images, the identification information corresponding to each of the second initial images may be generated, and the sequence of capturing the second initial images may be marked by the identification information. More specifically, the identification information may be, but not limited to, capturing moments of the second initial images, phases of the second initial images, and the like. The capturing moments of the second initial images may be configured to indicate moments at which the second initial images are captured. According to the capturing moments, it is possible to determine a time sequence in which the second initial images are captured. For example, the second initial images may be marked with serial numbers as "01", "02", "03" and "04" according to the sequence of the capturing moments.

At block 704, whether at least one of the captured second initial images is lost is determined according to the identification information. Based on the determination that no captured second initial image is lost, the second initial images and the corresponding identification information may be packaged.

It is possible to determine whether at least one of the captured second initial images is lost according to the foregoing identification information. When at least one of the captured second initial images is lost, the currently captured second initial images may be discarded. However, when no captured second initial image is lost, the second initial images and the corresponding identification information may be packaged. For example, when the serial numbers of the acquired second initial images are "01", "03", and "04", it means that the second initial image with a serial number of "02" is lost in the middle.

At block 706, a second format conversion may be performed on the packaged second initial images according to the identification information.

The packaged second initial images may be transmitted as a whole, such that it is impossible to loss only one image or some of the images during the transmission. Instead, all the second initial images may be present or discarded in some embodiments. After the second initial images and the identification information are packaged, the second initial images and the identification information may be transmitted to the processor for format conversion. More specifically, the sequence of capturing the second initial images may be determined according to the identification information, and then the second initial images may be synthesized into one depth image according to the sequence of capturing the second initial images.

Figure 8:
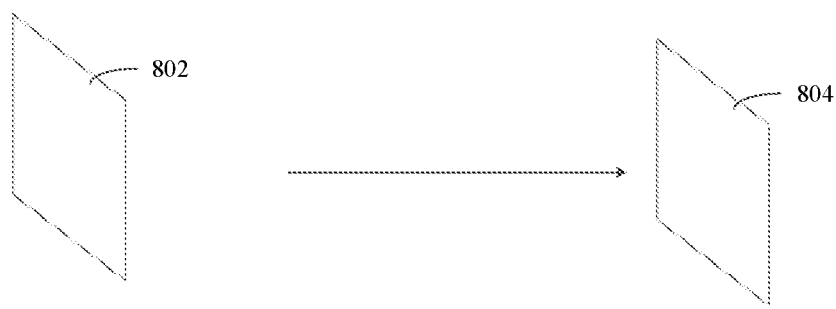
FIG. 8 is a schematic view illustrating an image processing flow according to some embodiments of the present disclosure.
Figure 8:
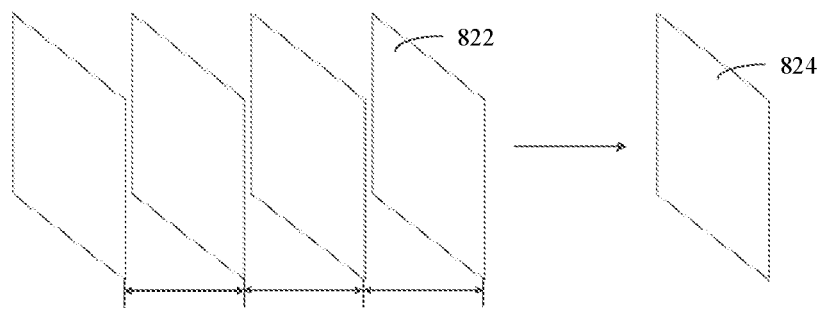

As shown in FIG. 8, the first camera may acquire the first initial image 802 at the first frame rate during the exposure period. The second camera may acquire the second initial images 822 at the second frame rate during the exposure period. After that, the first target image 804 may be calculated according to the first initial image 802. The depth image 824 (also called as the second target image) may be calculated according to second initial image 822. Finally, the acquired first target image 804 and depth image 824 may be processed.

In the image processing method provided by the above embodiments, the first camera may capture the first initial image at the first frame rate during the given exposure period, and the second camera may capture at least two second initial images at the second frame rate during the exposure period. The processing may be further performed according to the first target image generated from the first initial image and the depth image generated from the second initial images. In this way, it is possible to ensure that the first camera and the second camera may acquire the images in the same exposure period. Besides, the second camera may simultaneously acquire at least two second initial images, and generate the final depth image for further processing according to the at least two second initial images. Thus, the errors generated during the capturing of images may be reduced, and the accuracy of image processing may be improved.

It should be understood that, although the blocks in the flow charts of FIGS. 2, 3, 4, 6, 7, and 8 are presented sequentially according to the indication by arrows, however, these blocks are not necessarily performed in the order indicated by the arrows. Unless expressly stated by the present disclosure, these blocks will not be limited to a strict order, and may be executed in other orders. Moreover, at least a part of the blocks in FIGS. 2, 3, 4, 6, 7, and 8 may include a plurality of sub-blocks or stages. These sub-blocks or stages are not necessarily performed at the same time or moment, but may be performed at different times or moments. These sub-blocks or stages will not necessarily be performed successively, but may be performed alternately with other blocks or at least a part of the sub-blocks or stages of other blocks.

Figure 9:
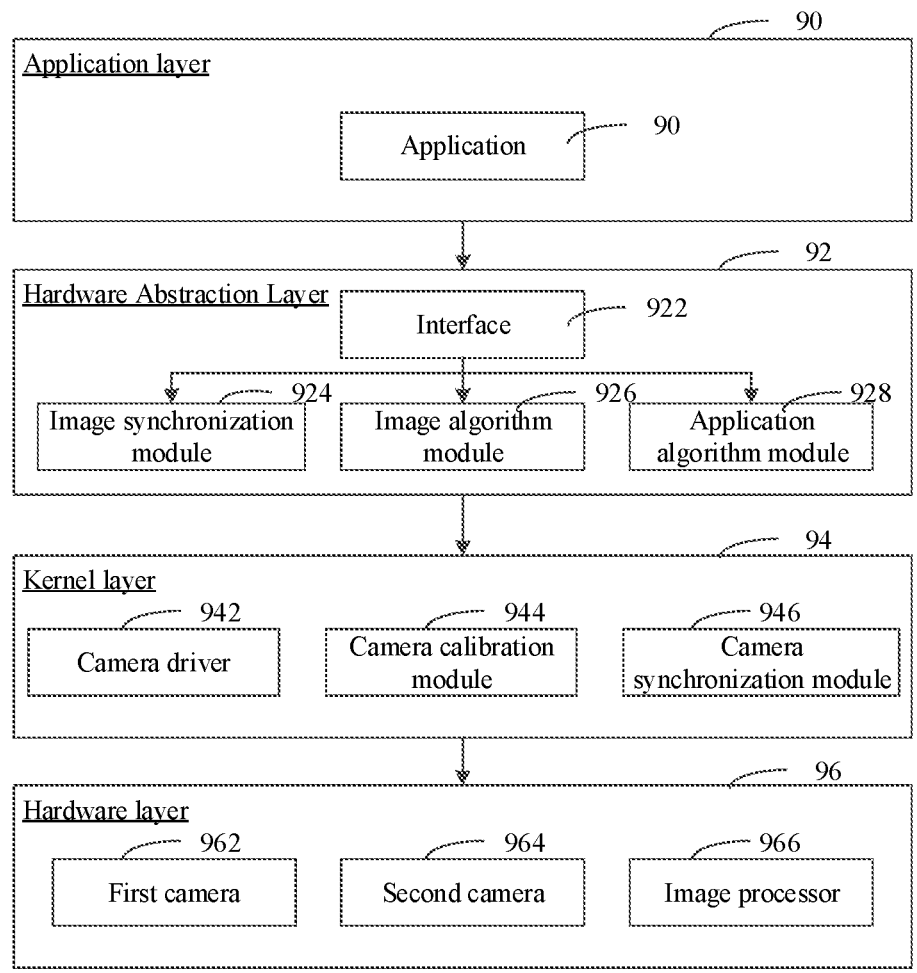
FIG. 9 is a block diagram illustrating a software framework for implementing an image processing method according to some embodiments of the present disclosure.

FIG. 9 is a block diagram illustrating a software framework for implementing the image processing method aforesaid according to some embodiments of the present disclosure. As shown in FIG. 9, the software framework may include an application layer 90, a Hardware Abstraction Layer (HAL) 92, a Kernel layer 94, and hardware layer 96. The application layer 90 may include an application 902. The hardware abstraction layer 92 may include an interface 922, an image synchronization module 924, an image algorithm module 926, and an application algorithm module 928. The kernel layer 94 may include a camera driver 942, a camera calibration module 944, and a camera synchronization module 946. The hardware layer 96 may include a first camera 962, a second camera 964, and an Image Signal Processor (ISP) 966.

In some embodiments, the application 90 may be configured to initiate an image-capturing instruction and then transmit the image-capturing instruction to the interface 922. After the interface 922 parses the image-capturing instruction, configuration parameters of the camera may be defined by the camera driver 942. And then, the configuration parameters may be further transmitted to the image processor 966. The first camera 962 and the second camera 964 may be controlled, by the image processor 966, to be turned on. After the first camera 962 and the second camera 964 are turned on, the first camera 962 and the second camera 964 may be controlled by the camera synchronization module 946 to synchronously capture images. A first initial image captured by the first camera 962 and a second initial image captured by the second camera 964 may be further transmitted to the image processor 966, and then transmitted to the camera calibration module 944 via the image processor 966. The camera calibration module 944 may align the first target image with the second initial image, and then transmit the aligned first and second initial images to the hardware abstraction layer 92. The image synchronization module 924 in the hardware abstraction layer 92 may be configured to determine whether the first target image and the second initial images are simultaneously acquired according to the first time point at which the first target image is captured and the second time point at which the second initial image is captured. The image algorithm module 926 may calculate the first target image according to the first initial image, and calculate the depth image according to the second initial images, only when the first target image and the second initial images are simultaneously acquired. The first target image and the depth image may be processed (such as being packaged and the like) by the application algorithm module 928, and then the processed (such as packaged and the like) first target image and the depth image may be transmitted to the application 902 via the interface 922. After receiving the first target image and the depth image, the application 902 may perform the processing such as three-dimensional modeling, beautifying, augmented reality (AR), and the like, according to the first target image and the depth image.

Figure 10:
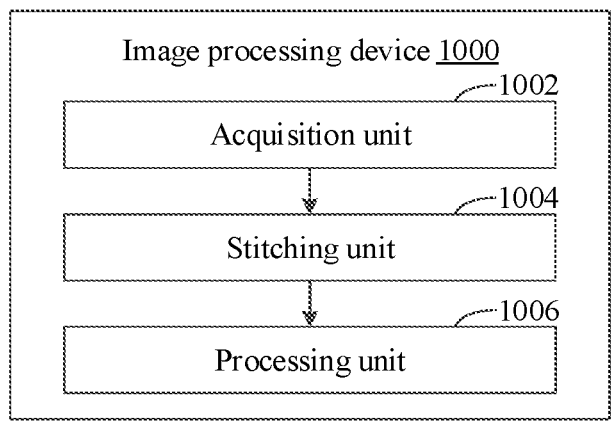
FIG. 10 is a block diagram of an image processing device according to some embodiments of the present disclosure.

FIG. 10 is a block diagram of an image processing device according to some embodiments of the present disclosure. The image processing device may be configured to achieve or perform the image processing method in some embodiments as previously described. As shown in FIG. 10, the image processing device 1000 may include an acquisition unit 1002, a stitching unit 1004, and a processing unit 1006.

The acquiring unit 1002 may be configured to acquire a first initial image that is captured by a first camera at a first frame rate during an exposure period, and acquire at least two second initial images that are captured by a second camera at a second frame rate during the exposure period. In some embodiments, the first frame rate may be less than the second frame rate. The second camera may be a TOF camera, and the second initial image may be an image with depth information.

The stitching unit 1004 may be configured to stitch the at least two second initial images into one depth image.

The processing unit 1006 may be configured to process the depth image and a first target image. Herein, the first target image may be generated from the first initial image.

In the image processing device provided by the above embodiments, it is possible to acquire the first initial image and a plurality of second initial images during the same exposure period. After that, the plurality of second initial images may be stitched into one depth image. The first target image generated from the first initial image and the one depth image may be further processed. Compared with the TOF camera in the related art, the frame loss may be less prone to occur in the image processing device according to some embodiments of the present disclosure, thereby improving the stability of the image processing system.

In some embodiments, the second initial image may include image data and metadata corresponding to the image data. The stitching unit 1004 may be configured to stitch the at least two second initial images into one depth image. More specifically, the stitching unit 1004 may be configured to: extract the image data and the metadata in each of the second initial images; package the extracted image data and metadata; and store the packaged image data and metadata. The stored image data and metadata may be data of the depth image.

In some embodiments, the stitching unit 1004 may be configured to package the extracted image data and metadata by the following operations.

The image data and the corresponding metadata of the at least two second initial images may be stitched respectively; or the image data and the metadata of the at least two second initial images may be sequentially stitched together according to the exposure timing.

In some embodiments, at least one of the captured at least two second initial images may be configured as a key frame, and at least one of the captured at least two second initial images may be a non-key frame. The stitching unit 1004 may be configured to package the extracted image data and metadata by: calculating phase difference data between a pixel point in the key frame and a corresponding pixel point in the non-key frame; extracting the image data and the metadata of the key frame, and packaging the calculated phase difference data and the image data and metadata of the key frame.

In some embodiments, the metadata may be configured to indicate the sequence of capturing the second initial images. The stitching unit 1004 may be configured to stitch the at least two second initial images into the depth image by: determining whether at least one of the captured second initial images is lost according to the metadata; based on the determination that no captured second initial image is lost, packaging the second initial image and corresponding identification information; and synthesizing the packaged second initial images into the depth image according to the identification information.

In some embodiments, the acquiring unit 1002 may be configured to acquire the at least two second initial images that are captured by the second camera at the second frame rate during the exposure period by the following actions or operations.

A laser emitter may be controlled to emit at least two laser waves at the second frame rate during the exposure period.

The laser waves may be reflected by the object and reflected laser waves may be generated, and at least two corresponding second initial images formed by the reflected laser waves may be captured by the second camera during the exposure period.

In some embodiments, the device 1000 may further include a calculation unit (not shown). The calculation unit may be configured to calculate the depth information corresponding to the at least two second initial images by using a time difference or a phase difference method.

The division of each module in the above embodiments of the image processing device is for illustrative purposes only. In other embodiments, the image processing device may be divided into other modules different from the above modules, to complete all or a part of the functions of the image processing device.

In some embodiments of the present disclosure, a computer-readable storage medium may be further provided. One or more non-transitory computer-readable storage media may include computer-executable instructions. When the computer-executable instructions are executed by one or more processors, the processor may be caused to perform the image processing method according to the above embodiments.

A computer program product may include instructions. When the computer program product is executed on a computer, the computer may be caused to perform the image processing method provided by the above embodiments.

Figure 11:
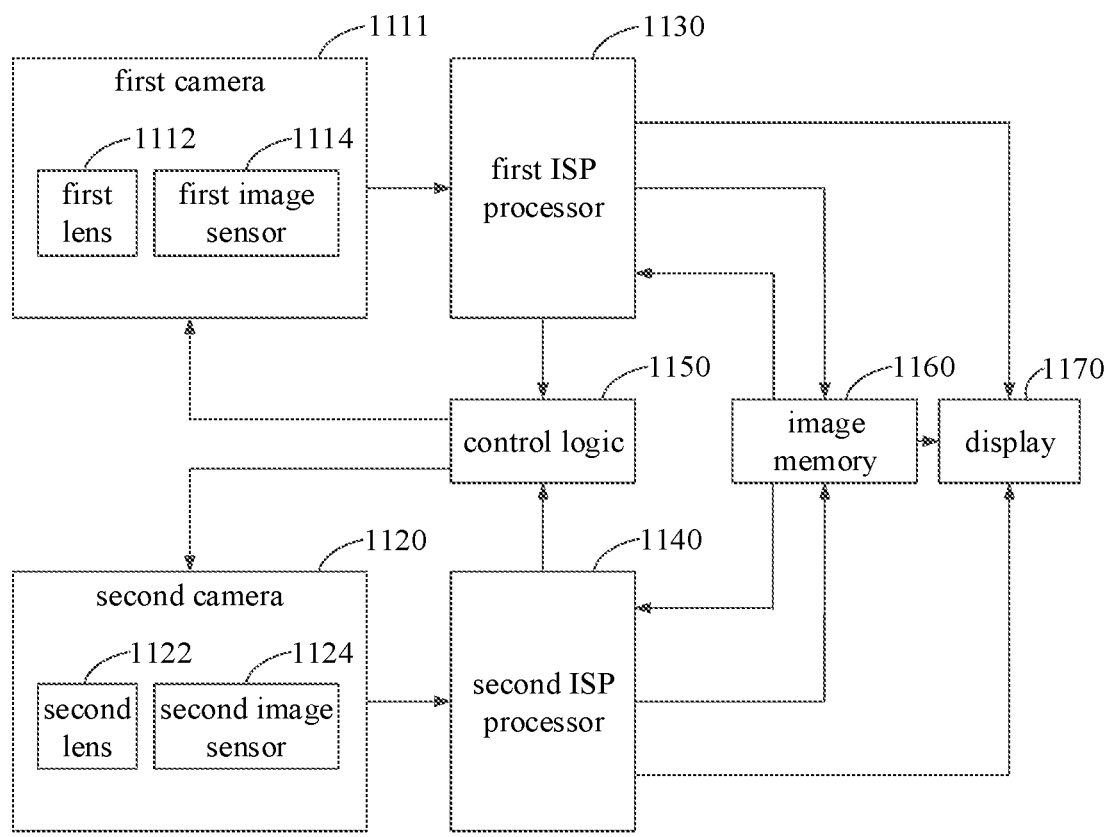
FIG. 11 is a block diagram of an image processing circuit according to some embodiments of the present disclosure.

In some embodiments of the present disclosure, an electronic apparatus may be further provided. The above electronic apparatus may include an image processing circuit. The image processing circuit may be implemented by hardware and/or software components, and may include various processing units defining an ISP (Image Signal Processing) pipeline. FIG. 11 is a block diagram of an image processing circuit according to some embodiments of the present disclosure. As shown in FIG. 11, for the sake of illustration, only various aspects of the image processing technique related to the embodiments of the present disclosure may be shown.

As shown in FIG. 11, the image processing circuit may include a first ISP processor 1130, a second ISP processor 1140, and a control logic 1150. A first camera 1111 may include one or more first lenses 1112 and a first image sensor 1114. The first image sensor 1114 may include a color filter array (such as a Bayer filter). The first image sensor 1114 may be configured to acquire light intensity and wavelength information captured by each imaging pixel of the first image sensor 1114, and provide a set of image data which can be processed by the first ISP processor 1130. The second camera 1120 may include one or more second lenses 1122 and a second image sensor 1124. The second image sensor 1124 may include a color filter array (such as a Bayer Filter). The second image sensor 1124 may be configured to acquire light intensity and wavelength information captured by each imaging pixel of the second image sensor 1124, and provide a set of image data which can be processed by the second ISP processor 1140.

A first initial image captured by the first camera 1111 may be transmitted to the first ISP processor 1130 for processing. After the first ISP processor 1130 processes the first initial image, statistical data (such as brightness of the image, contrast of the image, color of the image, and the like) of the first initial image may be transmitted to the control logic 1150. The control logic 1150 may be configured to determine control parameters of the first camera 1111 according to the statistical data, such that the first camera 1111 may perform operations, such as auto-focus, auto-exposure, and the like, according to the control parameters. The first initial image, after being processed by the first ISP processor 1130, may be stored in an image memory 1160. The first ISP processor 1130 may also be configured to read the image stored in the image memory 1160 for processing. In addition, after being processed by the ISP processor 113, the first initial image may be directly transmitted to the display 1170 for display. The display 1170 may also be configured to read the image in the image memory 1160 for display.

The first ISP processor 1130 may be configured to process image data pixel by pixel according to a plurality of formats. For example, each image pixel may have a bit depth of 8, 10, 12, or 14 bits. The first ISP processor 1130 may be configured to perform one or more image processing operations on the image data and collect the statistical information on the image data. In some embodiments, the image processing operations may be performed with same or different bit depth precisions.

The image memory 1160 may be part of a memory device, a storage device, or a separate dedicated memory within an electronic apparatus. The image memory 1160 may have a feature of DMA (Direct Memory Access).

When receiving the image data from the first image sensor 1114, the first ISP processor 1130 may perform one or more image processing operations, for example, time domain filtering. The processed image data may be transmitted to the image memory 1160 for additional processing before it is displayed. The first ISP processor 1130 may receive the processed data from the image memory 1160 and perform image data processing in RGB and YCbCr color space on the processed data. The image data processed by the first ISP processor 1130 may be output to the display 1170, such that the image data may be viewed by the user and/or be further processed by a graphics engine or a GPU (Graphics Processing Unit). In addition, the output of the first ISP processor 1130 may also be transmitted to the image memory 1160, and the display 1170 may read the image data from the image memory 1160. In some embodiments, the image memory 1160 may be configured to implement one or more frame buffers.

The statistical data determined by the first ISP processor 1130 may be transmitted to the control logic 1150. For example, the statistical data may include statistical information of the first image sensor 1114, such as auto-exposure, auto white balance, auto-focus, flicker detection, black level compensation, shading correction of the first lens 1212, and the like. The control logic 1150 may include a processor and/or a microcontroller that is configured to execute one or more routines (such as firmware). The one or more routines may be configured to determine control parameters of the first camera 1111 and the ISP processor 1130 according to the received statistical data. For example, the control parameters of the first camera 1111 may include gain, integration time of exposure control, anti-jitter parameters, flash control parameters, control parameters of the first lens 1112 (such as a focused or zoomed focal length), or a combination of these parameters, and the like. The ISP control parameters may include a gain level and color correction matrix for automatic white balance and color adjustment (for example, during RGB processing), and shading correction parameters of the first lens 1112.

Likewise, a second initial image captured by the second camera 1120 may be transmitted to the second ISP processor 1140 for processing. After the second ISP processor 1140 processes the second initial image, statistical data (such as brightness, contrast of the image, color of the image, and the like) of the second initial image may be transmitted to the control logic 1150. The control logic 1150 may be configured to determine control parameters of the second camera 1120 according to the statistical data, such that the second camera 1120 may perform operations, such as auto-focus, auto-exposure, and the like, according to the control parameters. The second initial image, after being processed by the second ISP processor 1140, may be stored in the image memory 1160. The second ISP processor 1140 may also be configured to read the image stored in the image memory 1160 for processing. In addition, after being processed by the ISP processor 114, the second initial image may be directly transmitted to the display 1170 for display. The display 1170 may also be configured to read the image in the image memory 1160 for display. The second camera 1120 and the second ISP processor 1140 may also implement the processes as described in the first camera 1111 and the first ISP processor 1130.

Any reference to a memory, storage, a database or other medium used in the present disclosure may include non-transitory and/or transitory memories. A non-transitory memory may include a Read-Only Memory (ROM), a Programmable ROM (PROM), an Electrically Programmable ROM (EPROM), an Electrically Erasable Programmable ROM (EEPROM) or a flash memory. The transitory memory may include a Random Access Memory (RAM), and may be used as an external high-speed buffer memory. Exemplarily but unlimitedly, the RAM may be obtained in various forms, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), a Rambus Direct RAM (RDRAM), a Direct RDRAM (DRDRAM) and a Rambus Dynamic RAM (RDRAM).

The abovementioned embodiments only describe some implementation modes of the disclosure and are specifically described in detail, but they should not be understood as limits to the scope of the disclosure. It should be pointed out that those skilled in the art may further make a plurality of transformations and improvements without departing from the concept of the disclosure. All these fall within the scope of protection of the disclosure. Therefore, the scope of protection of the patent disclosure should be subject to the appended claims.

What is claimed is:

1. A method of image processing for an electronic apparatus, the method comprising:
    acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information;
    generating a first target image by using the first initial image; and
    stitching the at least two second initial images into one depth image, wherein the depth image and the first target image synchronously correspond to each other in timing.

2. The method of claim 1, wherein each of the second initial images comprises image data and metadata corresponding to the image data; and
    stitching the at least two second initial images into one depth image comprises:
        extracting the image data and the metadata of each of the second initial images;
        packaging the image data and metadata extracted from the second initial images to form a packaged image data and metadata; and
        storing the packaged image data and metadata in a depth format to generate the depth image.

3. The method of claim 2, wherein packaging the extracted image data and metadata comprises:
    stitching the image data and the corresponding metadata of the at least two initial images, or
    sequentially stitching the image data of the at least two second initial images based on the exposure timing.

4. The method of claim 2, wherein at least one of the at least two second initial images is a key frame, and at least one of the at least two second initial images is a non-key frame; and
    packaging the extracted image data comprises:
        calculating a phase difference between a pixel point in the key frame and a corresponding pixel point in the non-key frame; and
        extracting the image data and the metadata of the key frame, and packaging the calculated phase difference and the image data and metadata of the key frame.

5. The method of claim 2, wherein the metadata is configured to indicate a sequence of acquiring the second initial images; and
    stitching the at least two second initial images into one depth image comprises:
        determining, according to the metadata, whether at least one of the at least two second initial images is lost; based on a determination that none of the second initial images is lost, packaging the second initial images and corresponding identification information; and
        synthesizing, according to the identification information, the packaged second initial images into the depth image.

6. The method of claim 1, wherein acquiring the at least two second initial images by the second camera at the second frame rate during the exposure period comprises:
    controlling a laser emitter to emit at least two laser waves at the second frame rate during the exposure period, wherein each of the at least two laser waves is reflected by an object such that a reflected laser wave is formed; and
    acquiring, by the second camera, the at least two second initial images generated by the reflected laser wave during the exposure period.

7. The method of claim 1, further comprising:
    after acquiring the at least two second initial images by the second camera at the second frame rate during the exposure period,
    calculating the depth information corresponding to the at least two second initial images by using a time difference method or a phase difference method.

8. The method of claim 1, wherein acquiring the first initial image by the first camera at the first frame rate during the exposure period and acquiring at least two second initial images by the second camera at the second frame rate during the exposure period comprises:
    when an image-capturing instruction is detected, acquiring the first initial image by the first camera at the first frame rate during the exposure period;
    acquiring the number of the second initial images, and calculating the second frame rate according to the number of the second initial images and the first frame rate; and
    acquiring the second initial images by the second camera at the calculated second frame rate during the exposure period.

9. The method of claim 8, wherein acquiring the number of the second initial images comprises one of:
    acquiring a preset number of second initial images;
    acquiring an application level corresponding to an application identifier included in the image-capturing instruction, and acquiring the corresponding number of the second initial images according to the application level; and
    acquiring jitter data of the electronic apparatus, and acquiring the corresponding number of the second initial images according to the jitter data.

10. The method of claim 1, further comprising:
    after acquiring the first initial image by the first camera at the first frame rate during the exposure period and acquiring at least two second initial images by the second camera at the second frame rate during the exposure period:
  acquiring a first time point at which the first initial image is captured and a second time point at which each of the second initial images is captured;
  determining whether a time interval between the first time point and the second time point is less than an interval threshold; and
  based on a determination that the time interval between the first time point and the second time point is not less than the interval threshold, discarding the first initial image and the at least two initial images.

11. The method of claim 1, wherein generating the first target image by using the first initial image further comprises:
  performing a first format conversion on the first initial image to generate the first target image;
  wherein stitching the at least two second initial images into one depth image comprises:
    packaging the at least two second initial images; and
    performing a second format conversion on the packaged second initial images to generate the depth image.

12. The method of claim 11, further comprising:
identifying a target object in the first target image;
acquiring, according to the depth image, target depth information corresponding to the target object; and
performing, according to the target depth information, processing on the target object.

13. The method of claim 12, further comprising:
after performing the first format conversion on the first initial image to generate the first target image, and before identifying the target object in the first target image:
  packaging the first target image and the depth image;
  encrypting the packaged first target image and depth image when an application having a level greater than a threshold; and
  transmitting the encrypted first target image and depth image to the application.

14. A non-transitory computer-readable storage medium storing a program which, when executed by a processor, cause the processor to perform an image processing method, wherein the method comprises:
  acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information;
  generating a first target image by using the first initial image; and
  stitching the at least two second initial images into one depth image, wherein the depth image and the first target image synchronously correspond to each other in timing.

15. The non-transitory computer-readable medium of claim 14, wherein each of the second initial images comprises image data and metadata corresponding to the image data, the method further comprising:
  packaging the at least two second initial images and performing a format conversion on the packaged second initial images to generate one depth image, comprising:
    extracting the image data and the metadata of each of the second initial images;
    packaging the extracted image data and metadata; and
    storing the packaged image data and metadata in a depth format to generate the depth image.

16. The non-transitory computer-readable medium of claim 15, wherein at least one of the at least two second initial images is a key frame, and at least one of the at least two second initial images is a non-key frame; and
  packaging the extracted image data and metadata comprises:
    calculating a phase difference between a pixel point in the key frame and a corresponding pixel point in the non-key frame; and
    extracting the image data and the metadata of the key frame, and packaging the calculated phase difference and the image data and metadata of the key frame; or
  packaging the extracted image data and metadata, comprises:
    stitching the image data and the corresponding metadata of the at least two initial images, or
    sequentially stitching the image data of the at least two second initial images based on the exposure timing.

17. The non-transitory computer-readable medium of claim 15, wherein the metadata is configured to indicate a sequence of acquiring the second initial images; and
  packaging the at least two second initial images and performing a format conversion on the packaged second initial images to generate one depth image comprises:
    determining, according to the metadata, whether at least one of the at least two second initial images is lost; based on a determination that none of the second initial images is lost, packaging the second initial images and corresponding identification information; and
    synthesizing, according to the identification information, the packaged second initial images into the depth image.

18. The non-transitory computer-readable medium of claim 15, wherein the method further comprises:
  after acquiring the first initial image by the first camera at the first frame rate during the exposure period and acquiring at least two second initial images by the second camera at the second frame rate during the exposure period, and before packaging the at least two second initial images and performing the format conversion on the packaged second initial images to generate one depth image:
    acquiring a first time point at which the first initial image is captured and a second time point at which each of the second initial images is captured;
    determining whether a time interval between the first time point and the second time point is less than an interval threshold; and
    based on a determination that the time interval between the first time point and the second time point is not less than the interval threshold, discarding the first initial image and the at least two initial images.

19. An electronic apparatus, comprising a non-transitory memory and a processor, wherein the non-transitory memory stores a computer program which, when executed by the processor, causes the processor to perform an image processing method; wherein the method comprises:
  acquiring a first initial image by a first camera at a first frame rate during an exposure period, and acquiring at least two second initial images by a second camera at a second frame rate during the exposure period; wherein the first frame rate is less than the second frame rate, and each of the second initial images is an image with depth information;

generating a first target image by using the first initial image; and stitching the at least two second initial images into one depth image, wherein the depth image and the first target image synchronously correspond to each other in timing.

20. The electronic apparatus of claim 19, wherein generating the first target image by using the first initial image further comprises performing a first format conversion on the first initial image to generate the first target image; and wherein stitching the at least two second initial images into one depth image comprises:

packaging the at least two second initial images; and performing a second format conversion on the packaged second initial images to generate the depth image.

* * * * *